(12) United States Patent
Richey et al.

(10) Patent No.: US 7,070,208 B2
(45) Date of Patent: Jul. 4, 2006

(54) STRAIGHT THREAD ADJUSTABLE PORT END

(75) Inventors: Paul Richey, Delaware, OH (US); Hiralal V. Patel, Dublin, OH (US)

(73) Assignee: Parker-Hannifin, Cleveland, OH (US)

( * ) Notice: Subject to any disclaimer, the term of this patent is extended or adjusted under 35 U.S.C. 154(b) by 113 days.

(21) Appl. No.: 10/738,723

(22) Filed: Dec. 17, 2003

(65) Prior Publication Data
US 2004/0164548 A1 Aug. 26, 2004

Related U.S. Application Data

(60) Provisional application No. 60/450,058, filed on Feb. 25, 2003.

(51) Int. Cl.
*F16L 15/00* (2006.01)
(52) U.S. Cl. .............. 285/220; 285/347; 285/212; 285/179
(58) Field of Classification Search .......... 285/347, 285/220, 918, 212, 179
See application file for complete search history.

(56) References Cited

U.S. PATENT DOCUMENTS

| | | | | |
|---|---|---|---|---|
| 2,373,253 A | * | 4/1945 | Martin | 285/220 |
| 2,759,743 A | * | 8/1956 | Bloom | 285/220 |
| 2,828,982 A | * | 4/1958 | Kennedy | 285/347 |
| 2,889,733 A | * | 6/1959 | Vanderhoof | 285/347 |
| 2,919,147 A | * | 12/1959 | Nenzell | 285/220 |
| 3,003,795 A | | 10/1961 | Lyon | |
| 3,101,206 A | | 8/1963 | Franck | |
| 3,151,896 A | | 10/1964 | Kody | |
| 3,240,515 A | | 3/1966 | Schmohl | |
| 3,346,935 A | | 10/1967 | Lyon | |
| 3,376,053 A | * | 4/1968 | Novakovich | 285/347 |
| 3,498,644 A | * | 3/1970 | Davies et al. | 285/212 |
| 5,115,550 A | | 5/1992 | Williamson | |

FOREIGN PATENT DOCUMENTS

DE 801 243 C 12/1950

* cited by examiner

*Primary Examiner*—David Bochna
(74) *Attorney, Agent, or Firm*—Daniel J Whitman; Joseph J. Pophal

(57) ABSTRACT

An externally threaded male hydraulic coupling member adapted for threaded and sealed attachment to a port body with a female port. The male coupling member having a tubular member with a threaded end, a bore extending through the member, a first cylindrical peripheral undercut portion longitudinally adjacent the threaded end, a series of intermediate external threads, and a second cylindrical undercut portion. The coupling member having a seal member and an annular ring member located in peripheral sealing contact with the first undercut portion. Wherein upon attachment, the seal member is encapsulated by the annular ring, the female port and the first undercut portion forming an annular chamber having a longitudinal extent greater than the seal member thickness. The coupling member also having a lock nut threadedly attached to the intermediate threads with a longitudinal end located between the annular ring and the intermediate threads. The lock nut having a longitudinal extent greater than the axial length of the intermediate threads and the second undercut portion.

15 Claims, 5 Drawing Sheets

STRAIGHT THREAD ADJUSTABLE PORT END

CROSS-REFERENCE TO RELATED CASES

The present application claims the benefit of the filing date of U.S. Provisional Application Ser. No. 60/450,058; filed Feb. 25, 2003.

FIELD OF THE INVENTION

The present invention relates to fittings and in particular to fittings, such as elbows, that require a sealed connection with a female port while allowing the fitting to take any rotational position relative to the port.

BACKGROUND OF THE INVENTION

Hydraulic fittings are used in systems for industrial equipment and commercial products to provide leakproof, full flow connections at various operating pressures. Elbow fittings of this type generally include two externally threaded ends, a body portion, an intermediate threaded portion, an O-ring, a washer and a lock nut. As an example of the use of such a fitting, one end of the fitting can mate with a female port and the other end can be attached to a rigid tube or flexible conduit. The hydraulics industry has relied on standards bodies, such as SAE, to regulate designs and dimensions so that the fitting can be interchangeable with other regulated mating parts.

SAE standards provide general and dimensional specifications for fittings. An example of such a fitting is shown in U.S. Pat. No. 3,240,515 to Schmohl. Manufacturers of the fittings provide end users with recommended assembly techniques for proper connections. However during installation of the fittings onto the mating parts, damage can occur to the fitting resulting in a leaking connection. In order to provide a leaktight connection, the O-ring must be properly sealed in a cavity formed by the washer, the female port, and the male fitting.

If an end user does not follow the recommended assembly technique the intermediate threaded portion on the male fitting can deform the washer. Damage to the washer disturbs the cavity and provides a leak path for the pressurized fluid. Damage to the washer can also result in damage to the O-ring. If the washer is deformed towards the O-ring, it can nick or cut the O-ring. Pressures inside the connection can also extrude the O-ring through any opening, e.g. the deformed washer, in the cavity.

Again if the end user does not follow the recommended assembly techniques the cavity can be too small to properly receive the O-ring. If the lock nut of the fitting is not in its correct position during installation, the washer will restrict the cavity. A restricted cavity will permanently deform the O-ring or contribute to the extrusion of the O-ring out of the cavity. Either occurrence can result in a leaking connection.

Fittings of this sort are intended to be used more than once. Reusable fittings can be connected to new conduits or a different female port. Damage to any component of the fitting will prevent the fitting from being reused. Specifically, damage to the washer can cause the same to bind on the body of the fitting. Damage to the O-ring can cause permanent deformation and the reduction in the usable life of the O-ring.

SUMMARY OF THE INVENTION

The present invention provides a coupling having one end suitable for attachment with a port body and a second end having attachment with a conduit to be used in systems for industrial equipment and commercial products. This invention helps prevent damage to the componentry of the coupling during installation.

A feature of the present invention is to provide a male coupling member having a tubular member with an externally threaded first end, an externally threaded second end angled relative to said first end, and a bore extending from the first end to the second end. The male coupling member further has a first cylindrical peripheral undercut portion longitudinally adjacent the threaded second end with a uniform diameter slightly less than the minor diameter of the second end threads, an intermediate external threaded portion longitudinally adjacent the first undercut portion with a first longitudinal end and a second longitudinal end, and a second cylindrical undercut portion of a uniform diameter longitudinally extending from the intermediate external threaded portion second longitudinal end to a shoulder portion. The coupling also has a seal member positioned in peripheral sealing contact around the first undercut portion, an annular ring member positioned in close contact around the first undercut portion and located between the seal member and the intermediate external threaded portion first longitudinal end, and a lock nut located on the side of the annular ring remote from the seal member having a first longitudinal end and a second longitudinal end, threadedly attached to the intermediate external threaded portion. The lock nut first longitudinal end being located between the annular ring and the intermediate external threaded portion first longitudinal end.

A further feature of the noted male coupling member has the longitudinal extent of the lock nut being at least equal to the combined total axial length of the second cylindrical undercut portion and the intermediate threaded portion. Another feature has the coupling member being reusable.

Still yet another feature has the male coupling member described above being adapted for threaded and sealed attachment to a port body having a female port with an inwardly tapered orifice blended into an internally threaded bore portion. Upon attachment of the male coupling member to the female port, an annular chamber is formed in which the seal member is encapsulated by the annular ring, the tapered orifice and the first cylindrical peripheral undercut portion. A further feature includes the annular chamber having a longitudinal extent greater than the thickness of the seal member.

Another attribute of the male coupling member has the lock being moveable between a first fully retracted position in which the second longitudinal end is in abutting contact with the shoulder portion and a second fully installed position wherein the first longitudinal end abuts the annular ring member. The lock nut can also cover the series of intermediate external threads in both the first and the second positions.

A still yet further feature includes a method of forming a hydraulic connection in which the male coupling member described above is threadedly attached to a port body having a female port. This method is comprised of providing a male coupling member and a female port as described above, attaching the male coupling member to the female port thus forming an annular chamber for encapsulating the seal member. The method also includes positioning the male coupling member to a desired angular orientation and further tightening the locknut in order to seal the annular chamber. The further attribute of the method includes loosening the locknut, disconnecting the male coupling member from the female body, and forming a further connection with another port body. Further features and advantages of the present invention will become apparent to those skilled in the art upon review of the following specification in conjunction with the accompanying drawings.

DETAILED DESCRIPTION OF THE PREFERRED EMBODIMENTS

Figure 1:
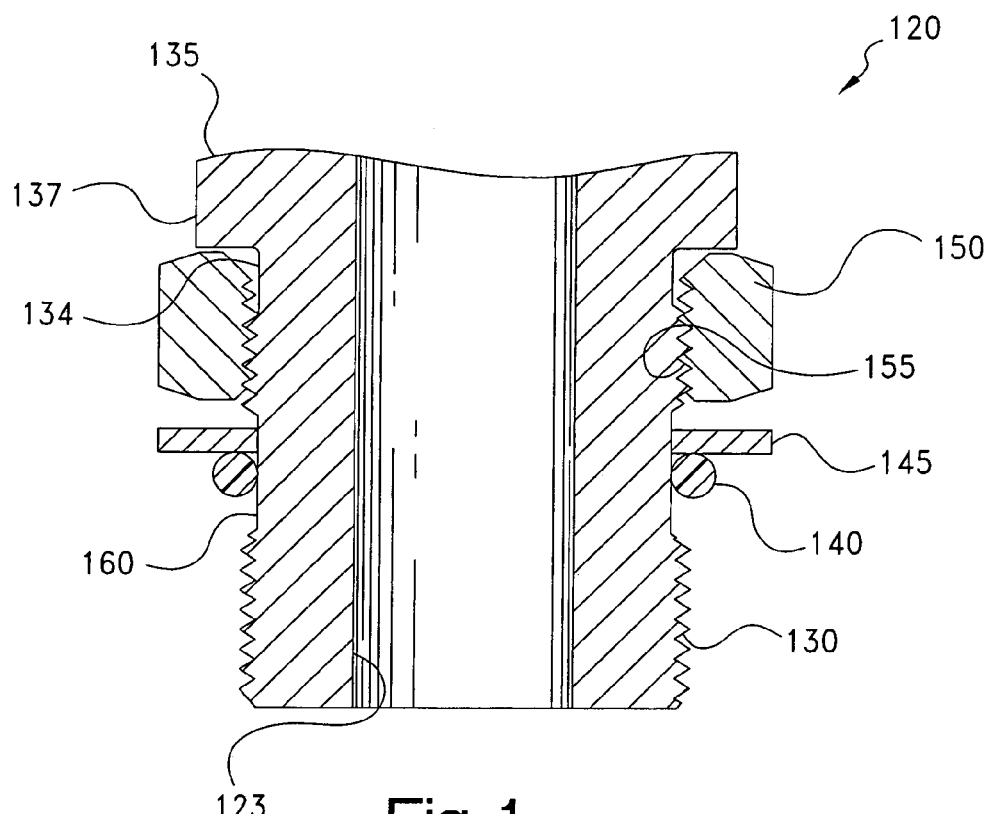
FIG. 1 is a fragmentary, cross-sectional view of a fitting according to the prior art shown prior to installation.

Referring to FIGS. 1–4, the prior art design for an adapter fitting 120 is shown. Adapter fitting 120 has a threaded port end 130, a body 135 (partially shown), an O-ring seal 140, a backup washer 145, and a lock nut 150, which is threadedly connected to an intermediate threaded portion 155. Located between threaded port end 130 and intermediate threaded portion 155 is an undercut section 160 which receives washer 145 and O-ring 140. An upper undercut section 134 is positioned between intermediate threaded portion 155 and body 135. FIG. 1 shows fitting 120 prior to installation.

Figure 2:
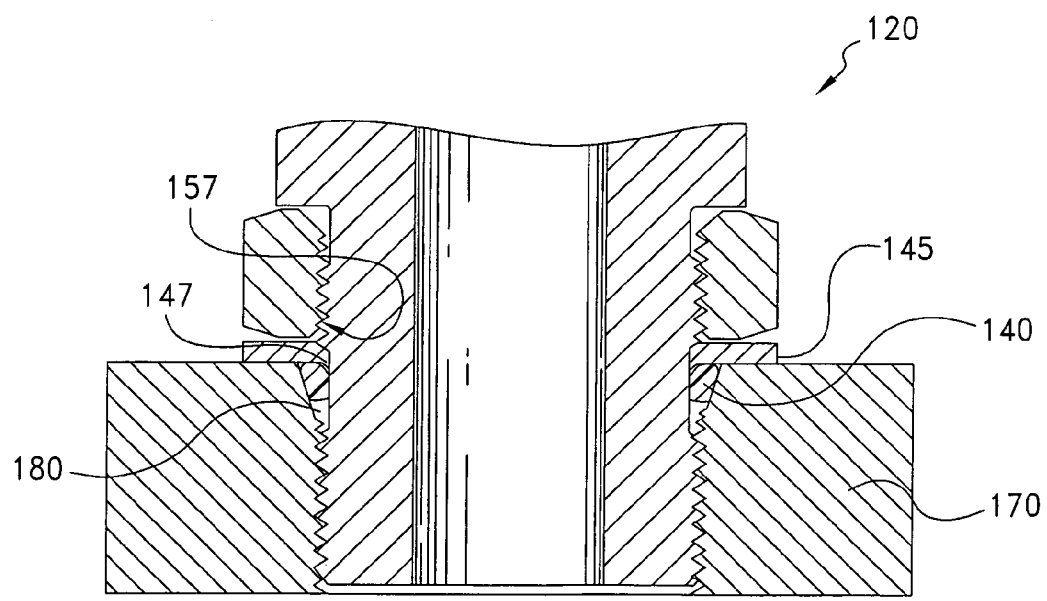
FIG. 2 is a fragmentary, cross-sectional view of the prior art fitting shown threaded into a receiving port.
Figure 3:
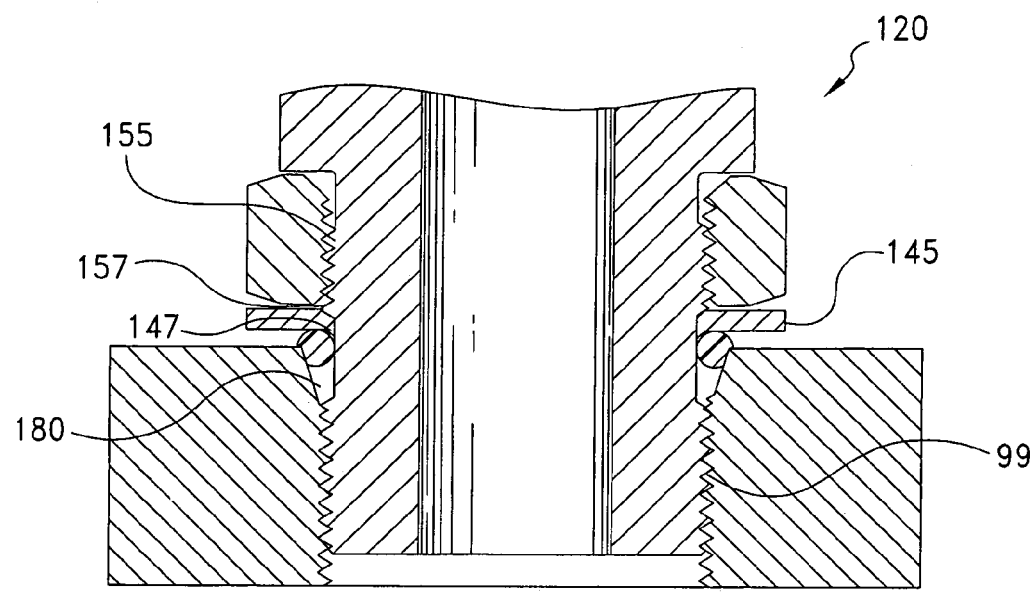
FIG. 3 is a fragmentary, cross-sectional view of the prior art fitting shown backed-out of its fully threaded position.
Figure 4:
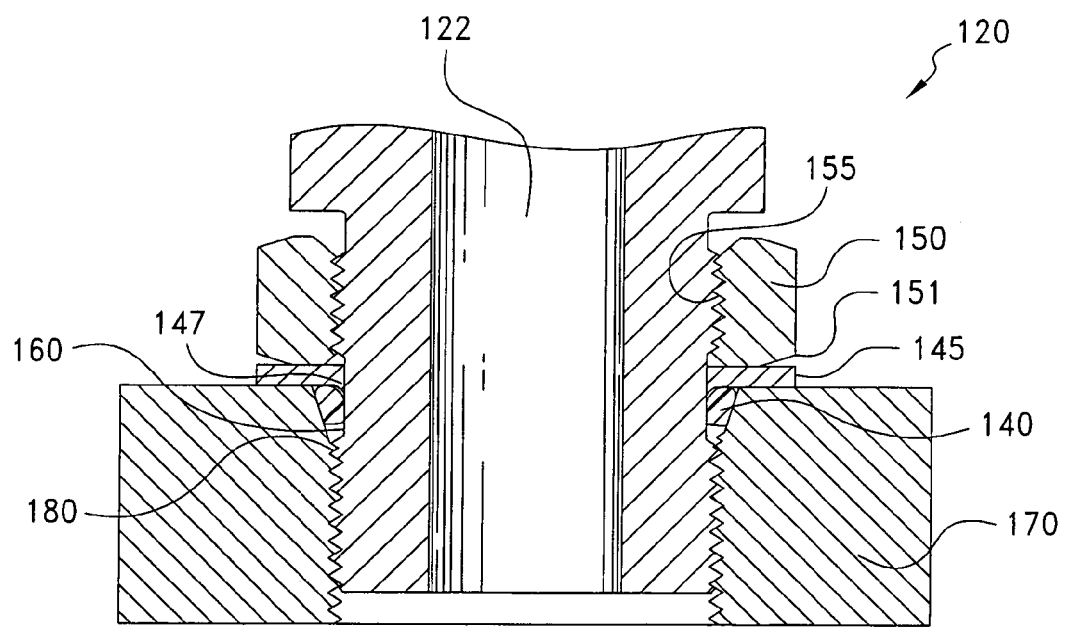
FIG. 4 is a fragmentary, cross-sectional view of the prior art fitting shown fully assembled.
Figure 5:
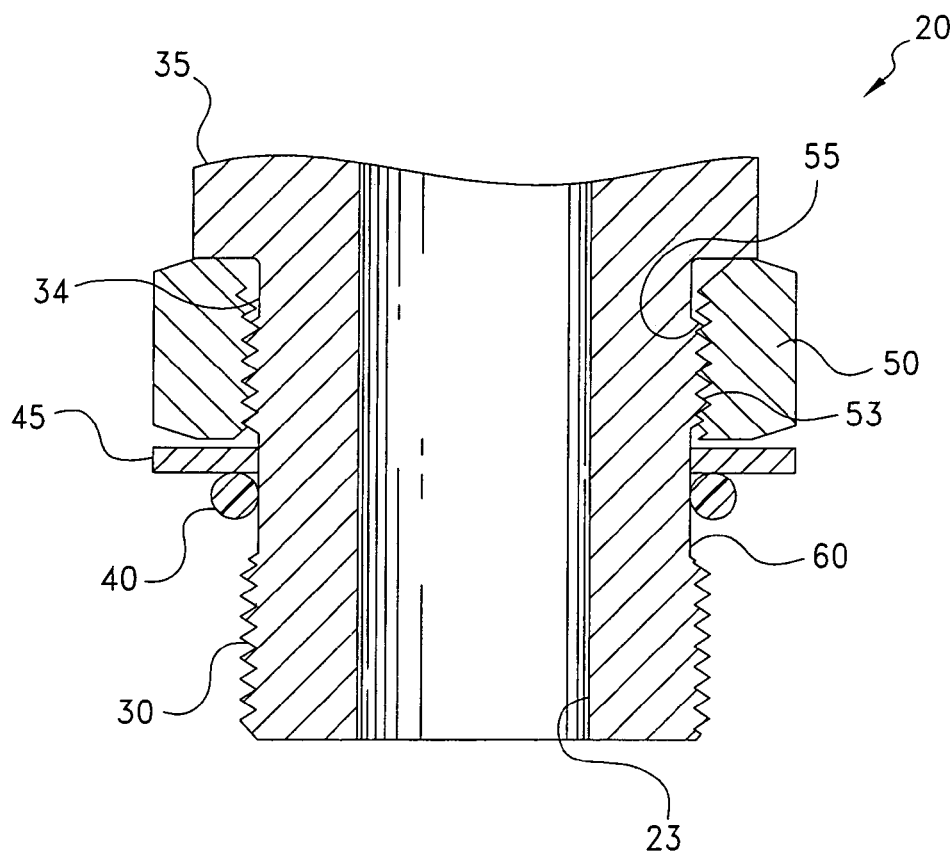
FIG. 5 is a fragmentary, cross-sectional view of a fitting according to the present invention shown prior to installation.

FIG. 2 shows fitting 120 after it has been threaded into port 170. Fitting 120 is threaded into port 170 until washer 145 rests on top of port body 170 thus encapsulating O-ring 140 in a cavity 180 created within the undercut section 160. The fitting is then "backed off", as necessary, up to a maximum of 1 full turn, for proper alignment, or orientation, of the opposite end (not shown) of fitting 120, as seen in FIG. 3. The fully assembled position is shown in FIG. 4. In this position, lock nut 150 has been tightened on intermediate threaded portion 155 until its bottom end 151 is in adjacent contact with washer 145 which, in turn, is moved to adjacent contact with the top of port body 170, thereby effectuating a seal of O-ring 140 within cavity 180.

A disadvantage of the prior art design shown in FIGS. 1–4 is that during the initial assembly of the fitting 120 into port 170, locknut 150 does not always extend up to or below a bottom thread 157 of intermediate threaded portion 155. As a result, bottom thread 157 of intermediate threaded portion 155 can contact washer 145 and downwardly deform washer 145 (as shown in FIG. 2) into created cavity 180. This deformation is represented by numeral 147 in FIGS. 2, 3 and 4.

As shown in FIG. 4, deformed washer 145 will not provide a proper seal of cavity 180, thus providing a leak path. This deformation can damage the sealing capability of O-ring 140 by pinching O-ring 140 against undercut 160. The deformation also widens the gap between the inside diameter of washer 145 and undercut 160. During operation, fluid pressures within internal bore 122 can extrude O-ring 140 out of cavity 180 through this gap. In extreme cases, the available volume for the O-ring 140 in cavity 180 is reduced enough by the deformation to cause overfill and O-ring 140 damage. The deformation of washer 145 also prevents the reusability of fitting 120.

The present invention is shown in FIGS. 5–8 and shows a fitting 20 that overcomes the disadvantages associated with the prior art design. Fitting 20 has a threaded port end 30, O-ring 40, and washer 45 similar to prior art fitting 120. Fitting 20 utilizes a lock nut 50 having a greater longitudinal length than prior art nut 150. Undercut section 60 has a longer longitudinal extent than that of prior art undercut 160. An intermediate threaded portion 55 separates undercut section 60 from an upper undercut section 34. The greater length of locknut 50 is equal to or more than the combined length of intermediate threaded portion 55 and upper undercut 34.

Figure 6:
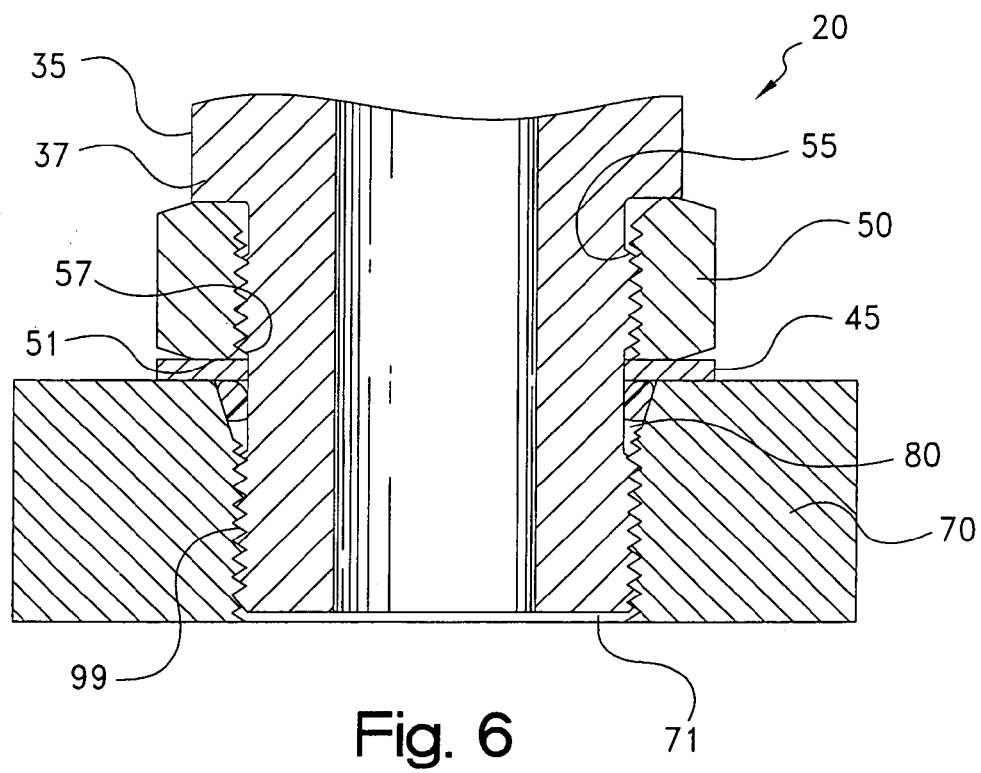
FIG. 6 is a fragmentary, cross-sectional view of the fitting according to the present invention shown threaded into a receiving port.
Figure 7:
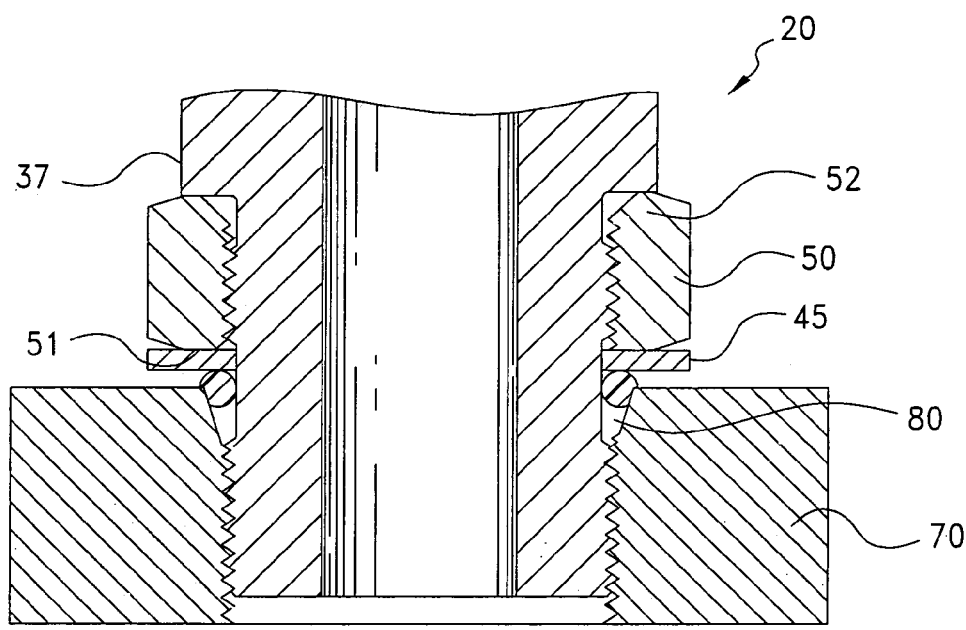
FIG. 7 is a fragmentary, cross-sectional view of the fitting according to the present invention shown backed-out of its fully threaded position.

FIG. 6 shows fitting 20 after it has been initially threaded into cavity 71 of port 70. During this step, fitting 20 is threaded into cavity 71 until washer 45 rests on top of port body 70. A bottom portion 51 of lock nut 50 comes into contact with the upper surface of washer 45 and prevents any contact between washer 45 and a lower thread 57 of intermediate threaded portion 55. Further tightening of fitting 20, before backing off for alignment, only squeezes washer 45 between the bottom surface 51 of locknut 50 and top surface of port 70 without deforming washer 45. Thus, the buffer provided by lock nut bottom portion 51 prevents any deformation to washer 45, thereby preventing any impairment to the sealing capability inside formed cavity 80. Specifically since washer 45 is not deformed, O-ring 40 is fully encapsulated within cavity 80 by washer 45, fitting 20, port body 70 and the threaded connection 99. Also, O-ring 40 is not physically damaged by washer 45 since it is not deformed.

Figure 8:
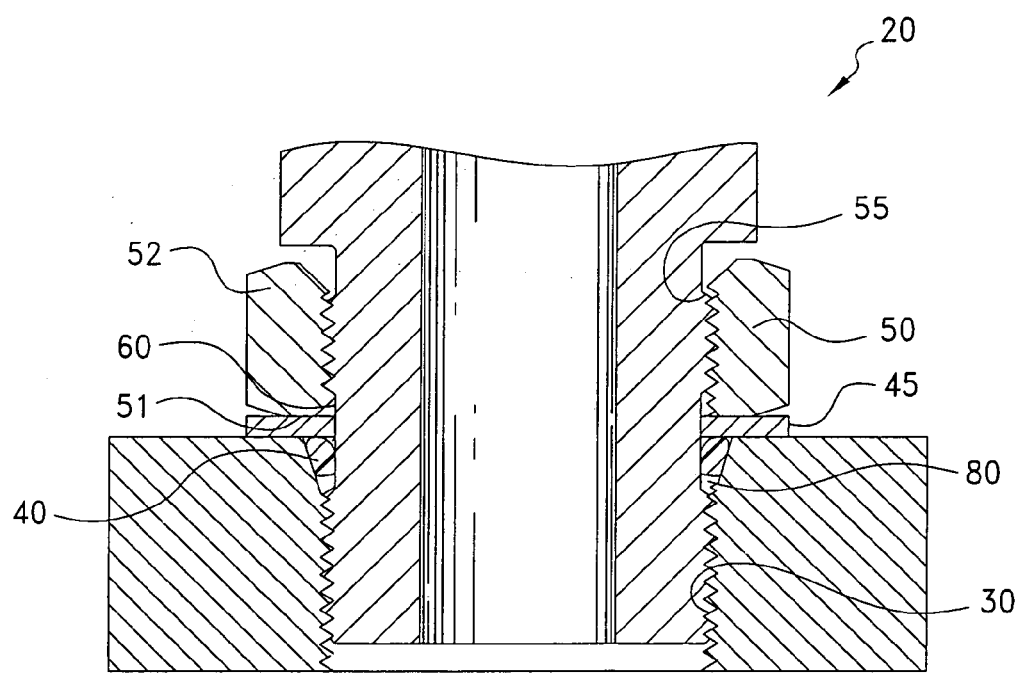
FIG. 8 is a fragmentary, cross-sectional view of the fitting according to the present invention shown fully assembled.

Referring to FIG. 8, as with prior art designs, once fitting 20 has been aligned (or oriented) into its desired position, lock nut 50 is wrench tightened onto intermediate threaded portion 55 until O-ring 40 is seated in cavity 80 and the bottom surface of washer 45 contacts the top of port body 70 providing a proper seal within cavity 80. It should be noted that although lock nut 50 has lower portion 51 that resides within undercut section 60, the volume within cavity 80 is not compromised. Undercut section 60 is lengthened (longitudinally) so that the same longitudinal distance is provided between washer 45 and threaded port end 30. Therefore, O-ring 40 is not sandwiched to any greater extent than that of the prior art. Cavity 80 has approximately the same volume as that of prior art cavity 180 so a proper seal is provided. Since undercut section 60 is lengthened, there is ample distance for lock nut lower portion 51 to rest between washer 45 and intermediate threaded portion 55.

Figure 10:
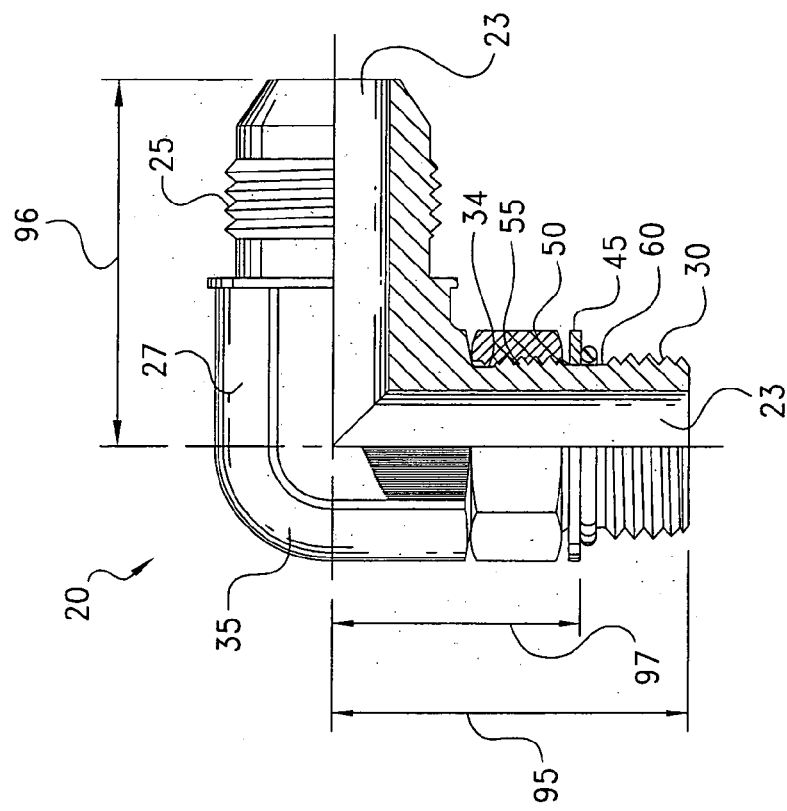
FIG. 10 is a frontal view, partially in cross-section, of the fitting according to the present invention.
Figure 9:
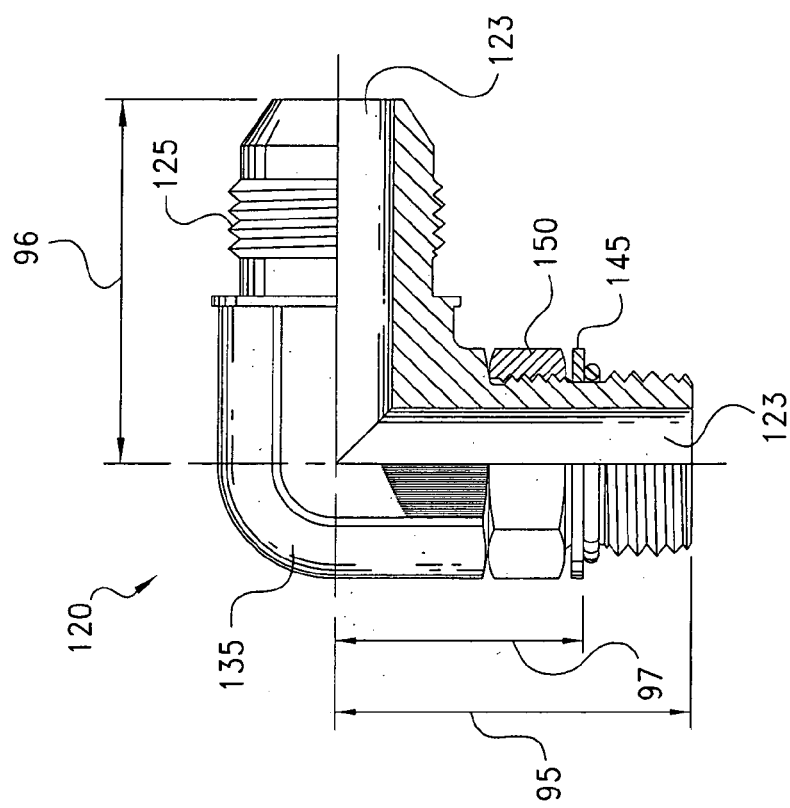
FIG. 9 is a frontal view, partially in cross-section, of the prior art fitting.

Referring to FIGS. 9–10, since the overall longitudinal length (referenced by numeral 95) of fitting 20 remains the same as in the prior art, upper undercut section 34 can be moved up in order to compensate for the lengthening of lower undercut section 60. By keeping the same longitudinal length 95, port distances for both ends do not have to be altered.

Referring to FIGS. 2 and 6, the present invention ensures that threads on locknut 50 are always in contact with intermediate threaded portion 55. This provides the best possible fastening means as well as ensuring that bottom thread 57 cannot touch washer 45. In the prior art, due to fitting 120 being able to travel further into cavity 180, intermediate threaded portion 155 may not be fully engaged with locknut 150. Therefore, the strength of the engaging threads is minimized and the possibility of shearing the threads with overtorque is heightened since all of the torque force is not distributed throughout the whole threaded surface.

Referring again to FIG. 8, another feature of the present design involves the increased holding area of nut 50. Nut 50 typically has an exterior surface convenient for engagement with a wrench. For example, nut 50 can have an exterior surface comprised of wrench flats. Since nut 50 is lengthened, the holding area for the wrench is increased.

Another feature of the present design involves the simplicity of installing fitting 20 into port body 70. Referring to FIG. 1, in the prior art the installer had to ensure that locknut 150 raised so that it was in contact with shoulder 137 of body 135. This step is necessary to ensure that cavity 180 is not decreased. For example, if upon initial installation locknut 150 is not raised, but is in lower contact with washer 145, it will push O-ring 140 deeper into cavity 180, thus minimizing the volume of cavity 180. Since locknut 50 in the present invention is longitudinally longer than prior art locknut 150, it is already in contact with body 35 and does not need to be raised prior to initial installation. This simplified the installation process and ensures that cavity 80 is not minimized.

In summary, the new design provides fitting locknut 50 with bottom portion 51 that has a buffer between washer 45 and bottom threads 57. This buffer ensures that during initial installation of fitting 20 into port cavity 71, bottom threads 57 do not deform washer 45. Rather, during initial installation of fitting 20, bottom portion abuts washer 45 before being backed off for orientation. Due to the non-deflection of washer 45, fitting 20 is prevented from traveling too far into cavity 71 since a positive stop is created by washer 45 for locknut 50 (and thus fitting 20). In the prior art, as is shown in FIG. 3, fitting 120 can over-travel into cavity 180 since washer 145 has deflected downward. Design changes have been made to ensure these performance features. These include increasing the longitudinal length of bottom undercut 60, increasing the longitudinal length of locknut 50, while moving up the upper undercut 34. This ensures that the overall longitudinal length of fitting 20 remains the same as in the prior art, or as is dictated by industry standards. The longer locknut 50 also provides an increased holding area for a torquing wrench.

It should be noted that the present invention is not limited to the specified preferred embodiments and principles. Those skilled in the art to which this invention pertains may formulate modifications and alterations to the present invention. These changes, which rely upon the teachings by which this disclosure has advanced, are properly considered within the scope of this invention as defined by the appended claims.

What is claimed is:

1. A male hydraulic coupling member comprised of:
    a tubular member with at least two ends including a first end, an externally threaded second end angled relative to said first end, a bore extending from said first end to said second end, a first cylindrical peripheral undercut portion longitudinally adjacent said threaded second end with a substantially uniform diameter slightly less than the minor diameter of said second end threads, an intermediate external threaded portion longitudinally adjacent said first undercut portion having a first longitudinal end and a second longitudinal end, said first longitudinal end of said intermediate external threaded portion being located immediately adjacent said first cylindrical peripheral undercut portion, a second cylindrical undercut portion of a substantially uniform diameter longitudinally extending from said second longitudinal end of said intermediate external threaded portion second longitudinal end to a shoulder portion;
    a seal member positioned within and in peripheral sealing contact with said first undercut portion;
    an annular ring member, positioned in close internal contact around said first undercut portion, located between said seal member and said intermediate external threaded portion first longitudinal end; and
    a lock nut, located on the side of the annular ring remote from said seal member, having a first longitudinal end and a second longitudinal end, an inner diameter of said lock nut being in threaded engagement with said intermediate external threaded portion, said lock nut first longitudinal end at a location immediately adjacent said inner diameter of said lock nut, regardless of the axial position of said lock nut relative to said intermediate external portion, always being located between said annular ring member and said intermediate external threaded portion first longitudinal end.

2. The coupling member of claim 1 wherein the longitudinal extent of said lock nut along said inner diameter is at least equal to the combined total axial length of said second cylindrical undercut portion and said intermediate threaded portion.

3. The coupling member of claim 1 wherein said coupling member is reusable.

4. The coupling member of claim 1 wherein said first end is externally threaded.

5. An externally threaded male hydraulic coupling member adapted for threaded and sealed attachment to a port body with a female port, said female port having an inwardly tapered orifice blended into an internally threaded bore portion, said male hydraulic coupling member being comprised of:
    a tubular member with at least two ends, including a first end, an externally threaded second end adapted for engagement with said port body internally threaded bore portion, said male coupling member having a longitudinal axis angled relative to said first end, a bore extending through said tubular member from said first end to said second end, a first cylindrical peripheral undercut portion longitudinally adjacent said externally threaded second end with a uniform diameter slightly less than the minor diameter of said second end threads, a series of intermediate external threads longitudinally adjacent said first undercut portion having a first longitudinal end and a second longitudinal end, a second cylindrical undercut portion of a uniform diameter longitudinally extending from said intermediate external threads second longitudinal end to a shoulder portion;
    a seal member located within and in peripheral sealing contact with said first undercut portion;
    an annular ring member positioned in close peripheral internal contact with said first undercut portion, located between said seal member and said intermediate external threads first end, wherein upon attachment of said male coupling member to said female port an annular chamber is formed in which said seal member is encapsulated by said annular ring, said tapered orifice and said first cylindrical peripheral undercut portion; and a lock nut, located on the side of the annular ring remote from said seal member, having a first longitudinal end and a second longitudinal end, an inner diameter of said lock nut being threadedly attached to said intermediate external threads, said lock nut second longitudinal end, when in a fully retracted position relative to said intermediate external threads, is in abutting contact with said shoulder portion and said lock nut first longitudinal end, at a location adjacent said inner diameter of said lock nut, extends axially beyond said series of intermediate external threads, and is adapted to engage said annular ring.

6. The male hydraulic coupling member as in claim 5 wherein, upon sealing attachment of said male coupling member to said female port of said port body, said lock nut second longitudinal end is spaced from said shoulder portion and said lock nut first longitudinal end is in abutting contact with said annular ring.

7. The male hydraulic coupling member as in claim 5 wherein said lock nut is moveable between a first fully retracted position in which said second longitudinal end is in abutting contact with said shoulder portion and a second fully installed position wherein said first longitudinal end abuts said annular ring member.

8. The male hydraulic coupling member as in claim 7 wherein said lock nut first longitudinal end is located between said intermediate external threads and said annular ring member in both said first and said second positions.

9. The male hydraulic coupling member as in claim 7 wherein said lock nut covers said series of intermediate external threads in both said first and said second positions.

10. The male hydraulic coupling member as in claim 5 wherein the longitudinal extent of said lock nut is at least equal to the combined total axial length of said second cylindrical undercut portion and said intermediate threads.

11. The male hydraulic coupling member as in claim 5 wherein said lock nut first longitudinal end, regardless of the longitudinal position of said lock nut, relative to said intermediate threads, always being located between said annular ring member and said intermediate threads.

12. The male hydraulic coupling member as in claim 5 wherein the longitudinal extent of said annular chamber is greater than the thickness of said seal member.

13. The male hydraulic coupling member as in claim 5 wherein said first end is externally threaded.

14. A male hydraulic coupling member comprised of:

a tubular member with at least two ends, wherein one of said at least two ends is provided with external threads and is angled relative to the other of said at least two ends, a bore extending from said one end to said other end, a first cylindrical peripheral undercut portion having one end longitudinally adjacent said threads and having a substantially uniform diameter slightly less than the minor diameter of said external threads, an intermediate externally threaded portion, longitudinally adjacent another end of said first undercut portion, having a first longitudinal end and a second longitudinal end, said first longitudinal end of said intermediate external threaded portion being located immediately adjacent said first cylindrical peripheral undercut portion, a second cylindrical undercut portion of a substantially uniform diameter longitudinally extending from said second longitudinal end of said intermediate external threaded portion second longitudinal end to a shoulder portion;

a seal member positioned within and in peripheral sealing contact with said first undercut portion;

an annular ring member, in close inner peripheral surface contact with said first undercut portion, located between said seal member and said intermediate external threaded portion first longitudinal end; and a lock nut, located on the side of the annular ring member remote from said seal member, having a first longitudinal end and a second longitudinal end, threadedly engaged with said intermediate external threaded portion, said lock nut first longitudinal end adapted to engage said annular ring and, regardless of the axial position of said lock nut relative to said intermediate external threaded portion, always being located between said annular ring and said intermediate external threaded portion first longitudinal end.

15. The coupling member of claim 14 wherein all of said ends are provided with external threads.

\* \* \* \* \*